Feb. 6, 1934.                  M. COHEN                    1,945,731
                        ELECTRICAL OUTLET MOLDING
                          Filed Dec. 18, 1930
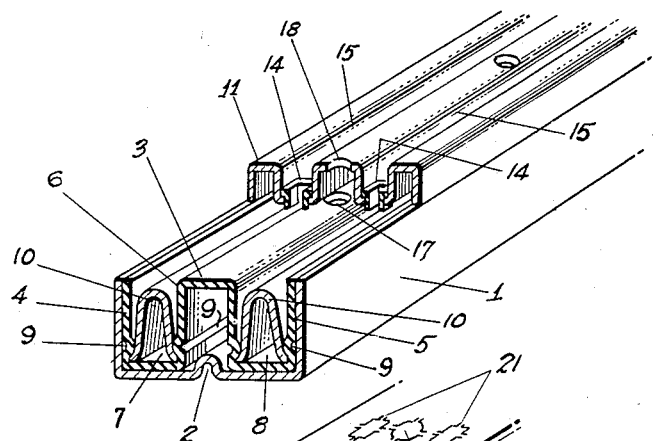
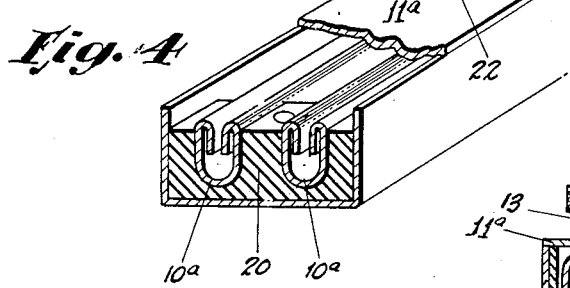
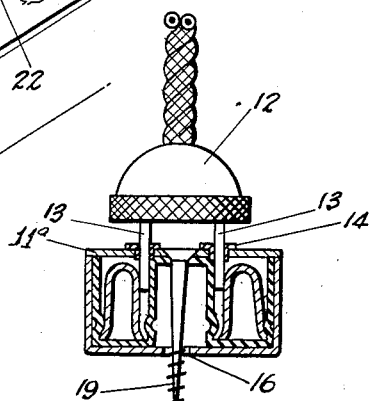
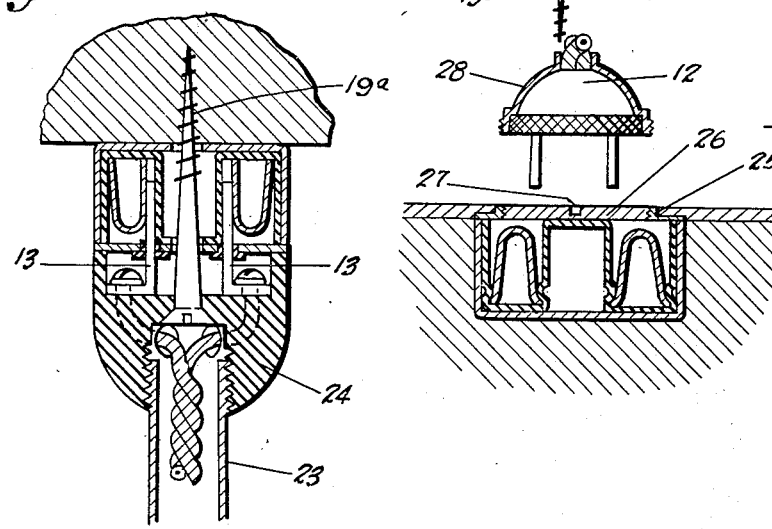
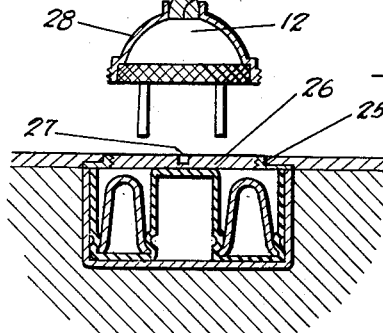
INVENTOR.
Michael Cohen
BY
Cornelius Zabriskie
ATTORNEY.

Patented Feb. 6, 1934

1,945,731

UNITED STATES PATENT OFFICE 1,945,731

ELECTRICAL OUTLET MOLDING

Michael Cohen, Brooklyn, N. Y.

Application December 18, 1930
Serial No. 503,162

6 Claims. (Cl. 247—3)

This invention is an electrical outlet molding adapted to be installed in dwellings, apartments, offices, factories, etc., by permanently attaching the molding in place to the wall, floor or ceiling, so that it will extend along one or more sides of the room and will provide at spaced apart points in its length for the "plugging in" of an electrical fixture or a cord having associated therewith a conventional plug.

From a more specific standpoint, the invention comprises a molding in which is housed substantially continuous electrical conductors insulated from one another and from the molding and adapted to carry the current through suitable connections from an appropriate source of current supply such as the ordinary house circuit. The molding has a cover and said cover is provided at spaced distances along its length with openings or "knock outs" through which the prongs of a plug may be inserted to electrically engage with the electrical conductors to which I have referred. Thus a plug or a fixture provided with prongs may be passed through any one of the series of knock outs or openings to engage with the conductors and thus place the cord or fixture in electrical association with said conductors.

The present invention embodies numerous novel features and is so constituted as to be thoroughly practical and of a character to satisfy the requirements of the Board of Fire Underwriters which latter prerequisite is essential to commercial value of a device of this character.

An important feature of this invention resides in the fact that the electrical conductors are wholly enclosed within and concealed by a molding in which they are housed, so that there is no possibility of persons receiving electrical shocks nor possibility of fire due to short circuiting. The device is such that it may be used in the side walls, ceiling or floor and be perfectly safe in any of these positions.

The invention embodies numerous novel features and advantages which will be hereinafter described in detail.

Features of the invention, other than those adverted to, will be apparent from the hereinafter detailed description and claims, when read in conjunction with the accompanying drawing.

The accompanying drawing illustrates different practical embodiments of the invention, but the constructions therein shown are to be understood as illustrative, only, and not as defining the limits of the invention.

Figure 1 is a section perspective showing a portion of the length of molding embodying this invention.

Figure 2 is a transverse section showing the same general type of molding as illustrated in Figure 1, but with a modified form of cover.

Figure 3 shows the structure of Figure 2 in section, but with a ceiling or side wall fixture associated therewith.

Figures 4 and 5 show further modified forms of the invention.

Referring first to Figure 1, 1 designates a length of material of channel cross section. In practice, I preferably use channel iron stock to form the member 1 and make the same of substantially U-shaped cross section as shown. Furthermore, I preferably, though not necessarily, rib the channel section as shown at 2, so as to impart to the section a backbone. The rib 2 may, if desired, be shaped to snugly fit the cross section of the liner 3. The liner 3 is of insulating material of any appropriate character of which fibre is mentioned by way of example. Its cross section may be described as triple U-shape, the two lateral U-shaped portions being designated 4 and 5, and the intermediate U-shaped portion being designated 6. The inner legs of the U-shaped portions 4 and 5 are also common with the outer legs of the U-shaped portion 6 to produce the section to which I have referred. The rib 2 may be shaped to conform to the U-shaped portion 6, although this is not essential. The U-shaped portions 4 and 5 form channels 7 and 8, the lateral walls of which channels are provided with beads 9 which extend into the channels, as shown, and positioned in each of these channels is an inverted U-shaped conductor strip 10. This strip is of metal and preferably of resilient cross section. It is adapted to be sprung into the channels in a manner to hook beneath and be retained in place by the beads 9. The strips 10 extend for the full length of the channels and form what I have hereinbefore referred to as continuous electrical conductors. These strips are fed with electrical current from any suitable supply connected to the strips in any approved manner, so that the strips constitute parallel electrical conductors from which current may be tapped off at any point in the length of the strips.

As stated, the strips are held in place by the beads 9 and if desired, the lateral flanges of the channel 1 may be provided with interior beads to fit into the outside channels of the beads 9, so as to retain the liner in place, but this is not necessary to the proper performance of this invention.

The open side of the channel section is adapted to be closed by a cover 11. This cover 11 may be flat or plane as shown in Figure 2 at 11a, but in Figure 1 I have shown the cover 11 as having an ornamental cross section, this cross section being of such shape as to serve a specific purpose. It will be noted in this connection that juxtaposed with the inner edges of the conductors 10, the cover is provided at spaced distances along its length with openings through which the prongs 13 of a conventional plug 12 may be passed to cooperate with the conductors. If the cover plate is of insulating material, such as fibre or other appropriate substance, these openings may be left plain, but if the cover is of a conducting material, such as metal, the openings should be provided with bushings 14, as shown in Figures 1 and 2.

When a molding of the character described is, for example, installed along a side wall near the floor, the openings with their bushings 14 are positioned within the bases of the channels 15 in the cover, so that a person looking down on the upper edge of the molding will simply see the ornamental configuration of the cover without seeing the bushings 14, or their associated openings because of the fact that said openings or bushings are set into the channels as stated. The openings are so positioned with respect to the conductors that when the prongs of a plug are passed through any companion set of openings, they will enter into the joint between the conductors 10 and the adjacent faces of the inverted U section 6, so that when the plug is forced into position the conductors will be sufficiently strong or flexed to afford a tight electrical connection as will be apparent from Fig. 2. The molding may be supported in position in any suitable way and may be nailed or screwed to lath or plaster or stone, etc., or it may be set into cement or plaster in a manner to require no other anchorage.

For the purpose of illustration, however, a very satisfactory mode of attachment is shown in Fig. 5. Here the base of the channel is perforated at spaced distances in its length as indicated at 16, and in juxtaposed positions the liner 3 and cover 15 are similarly perforated at 17 and 18, (Figs. 1 and 2), so that a screw 19 may be passed through the perforations 18, 17, and 16 in this order, to attach the whole structure in place. I do not limit the invention to this attachment as other forms of attachment may be employed.

In the construction of Figs. 1 and 2, the liner is shown as extending for the full length of the channel section to insulate the conductors throughout their length. In Figure 4, however, the conductors are supported in place and insulated from one another on appropriately spaced apart blocks 20 and said conductors are of somewhat different shape than disclosed in the preceding figures. Here the conductors designated 10a are of U-shaped section, but the free edges are returned upon themselves to form spring jaws adapted to grip the prongs of a plug resiliently to hold the same against inadvertent displacement. In this figure, furthermore, the cover 11a is shown as of metal with knock outs 21 for the plug prongs 13 and a knock out 22 to receive an attaching screw, such as the screw 19 to which I have referred.

Under ordinary conditions, the resilient engagement of the contact strips of either form described with the prongs of a plug will hold the plug sufficiently tight to permit its inadvertent displacement. However, when the device is used on a ceiling to support, for example, a ceiling fixture, it may be desirable, if the fixture is heavy, to provide for a positive attachment. Such an arrangement is shown in Fig. 3. Here the fixture tube is designated 23 and is adapted to screw into a member 24 which is centrally perforated. A screw 19a is adapted to be passed through this perforation and into the ceiling, so as to mount the member 24 positively in position and thereupon the tube 23 may be screwed into the member 24 to positively support the fixture. The member 24 corresponds in its function to the plug 12 in that it carries the prongs 13 which engage with the conductor strips as hereinbefore described.

Figure 5 shows the same general structure as Fig. 1, except that the cover is made perfectly flat and instead of providing bushed perforations for the prongs of the plug, there is positioned at suitable intervals along the length of the device interiorly threaded boxes 25, which are normally closed by screw disks 26, each having a slot 27 for the screw driver. A plug 12 of the kind shown in Fig. 2 is used with this construction, but if it is desired to positively lock the plug in place, or make a water-tight connection about the plug, said plug may have superimposed over it, a loose, close fitting shell 28, which, after the plug is in place, may be screwed into the threaded boss 25 as will be well understood.

In all the structures which I have described, the channel iron with its liner, conductors and cover may be made in appropriate lengths for conventional installation and these lengths may be connected in any suitable manner to extend for any desired linear dimension, so as to form, in effect, a continuous source of current supply throughout this distance. The openings for the plug which are provided in the cover are at appropriately spaced apart distances, so that in any portion of the room, a cord may be plugged in in the manner described. Thus, drop lights, electric radios, boudoir lamps and other accessories and electrical adjuncts can be connected to the molding at various points in its length where it will be most convenient to have these articles positioned. This is in pronounced contradistinction to approved prior practice where independent outlet boxes are required at each location where current supply is desired. Furthermore, where the present invention is installed the dangerous present practice of plugging in multiple plugs which overload a circuit cannot occur for the conductor sections are wired with conductors of sufficient size to carry the maximum load.

In the foregoing detailed description, I have set forth various practical forms of this invention, all of which embody constructions, which meet the requirements of the fire underwriters and which are perfectly safe to install under all conditions. These structures disclose the preferred forms of this invention but the invention is to be understood as fully commensurate with the appended claims.

Having thus fully described the invention, what I claim as new and useful and desire to secure by Letters Patent is:

1. In an assembly of the character described, a metallic casing of channeled cross section, a liner of insulating material positioned within the channel and having a cross section providing spaced apart parallel channels extending longitudinally thereof, resilient conductor strips positioned within each of the double channels of the liner, and a cover closing the open side of the casing and secured in place thereon, said cover having a channeled cross section, the channels of which are juxtaposed with the adjacent edges of the conductor strips and the bases of the cover channels having therein openings through which the prongs of a plug may be inserted into gripped relation with the conductor strips in the casing.

2. In an assembly of the character described, a metallic casing of channeled cross section, a liner of insulating material positioned within the channel and having a cross section providing spaced apart parallel channels extending longitudinally thereof, resilient conductor strips positioned within each of the double channels of the liner, a cover closing the open side of the casing and provided therein with longitudinally spaced apart pairs of openings, a plug having prongs extending through one pair of said openings into gripped relation with the conductor strips, and a screw extending through the plug and through the cover and casing into a suitably rigid support to mount the assembly on said support and secure the plug against inadvertent removal.

3. In an assembly of the character described, a casing of channeled cross section, an insulating liner seated in the channel of the casing and of triple U-shaped cross section to provide parallel channels extending longitudinally of the casing in spaced apart relation, and resilient conductor strips positioned within two of said channels.

4. In an assembly of the character described, a casing of channeled cross section, an insulating liner seated in the channel of the casing and of triple U-shaped cross section to provide parallel channels extending longitudinally of the casing in spaced apart relation, and resilient conductor strips positioned within two of said channels, and beads formed in the liner to extend along the sides of the parallel channels to maintain the strips against inadvertent disengagement from said channels.

5. In an assembly of the character described, a casing of channeled cross section, an insulating liner seated in the channel of the casing and of triple U-shaped cross section to provide parallel channels extending longitudinally of the casing in spaced apart relation, resilient conductor strips positioned within two of said channels, means for securing said conductor strips in said channels to maintain them insulated from the casing and from each other, and a cover closing the open side of the casing and secured thereto, said cover having therein openings through which the prongs of a plug may be inserted to engage with the conductor strips interiorly of the casing.

6. In an assembly of the character described, a casing of channeled cross section, an insulating liner seated in the base of said casing and of triple U-shaped cross section to provide two spaced apart parallel channels with an intermediate separating spacer, beads formed on said spacer and extending into the channels, inverted U-shaped resilient conductor strips seated in said channels and held in place by said beads to provide between the conductor strips and the separating spacer slots into which the prongs of a plug may be inserted to be engaged with and removably held in place by said resilient conductor strips.

MICHAEL COHEN.